United States Patent
Yang et al.

(10) Patent No.: US 10,965,141 B2
(45) Date of Patent: Mar. 30, 2021

(54) VEHICLE AND VEHICLE CHARGING APPARATUS

(71) Applicants: Hyundai Motor Company, Seoul (KR); Kia Motors Corporation, Seoul (KR)

(72) Inventors: Sihun Yang, Gyeonggi-do (KR); JinYoung Yang, Gyeonggi-do (KR); Jun Ho Kim, Gyeonggi-do (KR); Youngjin Kim, Incheon (KR); Jin Myeong Yang, Busan (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 46 days.

(21) Appl. No.: 15/642,882

(22) Filed: Jul. 6, 2017

(65) Prior Publication Data

US 2018/0257494 A1 Sep. 13, 2018

(30) Foreign Application Priority Data

Mar. 7, 2017 (KR) .......................... 10-2017-0028722

(51) Int. Cl.
*H02J 7/00* (2006.01)
*H02J 7/02* (2016.01)
(Continued)

(52) U.S. Cl.
CPC .............. *H02J 7/02* (2013.01); *B60L 11/1811* (2013.01); *B60L 53/14* (2019.02); *B60L 53/20* (2019.02);
(Continued)

(58) Field of Classification Search
USPC .................................. 320/103, 107, 109, 162
See application file for complete search history.

(56) References Cited

U.S. PATENT DOCUMENTS

| 4,788,635 A * | 11/1988 | Heinrich | H02M 5/4505 318/762 |
| 8,988,900 B2 * | 3/2015 | Toliyat | H02M 5/4585 363/17 |

(Continued)

OTHER PUBLICATIONS

Y. Jang et al., "Interleaved Boost Converter with Intrinsic Voltage-doubler Characteristic for Universal-Line PFC Front End", IEEE Transaction on Power Electronics, 22(4), pp. 1394-1401 (2007).

(Continued)

*Primary Examiner* — Brian Ngo
(74) *Attorney, Agent, or Firm* — Mintz Levin Cohn Ferris Glovsky and Popeo, P.C.; Peter F. Corless

(57) ABSTRACT

A vehicle charging apparatus includes: an AC/DC converter configured to variably output a DC link voltage; and a DC/DC converter electrically connected to the AC/DC converter and configured to acquire an output voltage by conversion of the DC link voltage outputted by the AC/DC converter and transmit the acquired output voltage to a battery. The AC/DC converter includes: a first switch element configured to adjust a power factor of the AC/DC converter according to an operation of the first switch element, and a second switch element configured to increase the DC link voltage outputted by the AC/DC converter according to the operation of the first switch element.

18 Claims, 9 Drawing Sheets

(51) Int. Cl.

| | | |
|---|---|---|
| *B60L 53/20* | (2019.01) | |
| *H02M 3/337* | (2006.01) | |
| *B60L 53/22* | (2019.01) | |
| *H02M 3/158* | (2006.01) | |
| *H02M 1/42* | (2007.01) | |
| *B60L 53/14* | (2019.01) | |
| *H02J 3/16* | (2006.01) | |
| *B60L 11/18* | (2006.01) | |
| *H02J 7/04* | (2006.01) | |
| *H02M 1/15* | (2006.01) | |
| *H02M 3/335* | (2006.01) | |
| *H02M 7/217* | (2006.01) | |
| *H02M 1/00* | (2006.01) | |

(52) U.S. Cl.
CPC ............... *B60L 53/22* (2019.02); *H02J 3/16* (2013.01); *H02J 7/0027* (2013.01); *H02J 7/0072* (2013.01); *H02J 7/022* (2013.01); *H02J 7/04* (2013.01); *H02M 1/15* (2013.01); *H02M 1/4225* (2013.01); *H02M 3/1584* (2013.01); *H02M 3/3376* (2013.01); *H02M 3/33569* (2013.01); *H02M 7/217* (2013.01); *B60L 2210/10* (2013.01); *B60L 2210/14* (2013.01); *B60L 2210/30* (2013.01); *H02J 2207/20* (2020.01); *H02M 2001/007* (2013.01); *Y02T 10/70* (2013.01); *Y02T 10/7072* (2013.01); *Y02T 10/72* (2013.01); *Y02T 90/12* (2013.01); *Y02T 90/14* (2013.01)

(56) References Cited

U.S. PATENT DOCUMENTS

| | | | | |
|---|---|---|---|---|
| 9,325,249 B2* | 4/2016 | Bucheru | ............. | H02M 1/4258 |
| 9,515,562 B2* | 12/2016 | Dai | ..................... | H02M 3/3353 |
| 10,158,245 B2* | 12/2018 | Yang | ..................... | H02J 7/0052 |
| 2008/0031019 A1* | 2/2008 | Alexander | .......... | H02M 3/1582 |
| | | | | 363/37 |
| 2010/0182803 A1* | 7/2010 | Nan | .................. | H02M 3/33592 |
| | | | | 363/21.02 |
| 2012/0112657 A1* | 5/2012 | Van Der Veen | .... | H02M 1/4225 |
| | | | | 315/291 |
| 2012/0235626 A1* | 9/2012 | Oh | ........................ | H02J 7/0022 |
| | | | | 320/103 |
| 2013/0026975 A1* | 1/2013 | Liu | ....................... | H02M 7/219 |
| | | | | 320/107 |
| 2013/0057200 A1* | 3/2013 | Potts | .................. | H02M 3/33584 |
| | | | | 320/107 |
| 2013/0249469 A1* | 9/2013 | Pahlevaninezhad | .... | H02J 7/022 |
| | | | | 320/107 |
| 2015/0042159 A1* | 2/2015 | Kim | ..................... | B60L 11/1811 |
| | | | | 307/10.1 |
| 2015/0054469 A1* | 2/2015 | Jang | ..................... | B60L 11/1816 |
| | | | | 320/162 |
| 2015/0069953 A1* | 3/2015 | Seong | ................. | B60L 11/1812 |
| | | | | 320/107 |
| 2016/0016479 A1* | 1/2016 | Khaligh | .............. | B60L 11/1812 |
| | | | | 363/17 |
| 2016/0165684 A1* | 6/2016 | Ramabhadran | .... | H05B 33/0815 |
| | | | | 315/186 |
| 2017/0144555 A1* | 5/2017 | Chun | .................... | B60L 11/005 |
| 2018/0248489 A1* | 8/2018 | Wang | ................... | H02M 7/217 |
| 2018/0257494 A1* | 9/2018 | Yang | ................... | B60L 11/1811 |

OTHER PUBLICATIONS

P. Radika et al., "High Voltage Gain Interleaved Boost Converter", International Jounal of Advanced Research in Electrical, Electronics and Instrumentation Engineering, 3(1), pp. 6901-6910 (2014).

\* cited by examiner

VEHICLE AND VEHICLE CHARGING APPARATUS

CROSS-REFERENCE TO RELATED APPLICATION

This application claims the benefit of priority to Korean Patent Application No. 10-2017-0028722, filed on Mar. 7, 2017 in the Korean Intellectual Property Office, the disclosure of which is incorporated herein by reference as if fully set forth herein.

BACKGROUND

1. Technical Field

Embodiments of this disclosure relate generally to a vehicle and a vehicle charging apparatus and, more particularly, to a vehicle charging apparatus including an AC/DC converter configured to variably output a DC link voltage and a DC/DC converter electrically connected to the AC/DC converter.

2. Description of the Related Art

Conventional vehicles acquire thermal energy by burning fossil fuels, such as gasoline or diesel, and convert the thermal energy into mechanical energy needed to rotate vehicle wheels. Recently, vehicles have been designed to acquire power needed to rotate vehicle wheels using electric energy, instead of thermal energy, e.g., by burning fossil fuels. A vehicle configured to acquire power using electric energy is referred to as an electric vehicle (EV).

Various kinds of electric vehicles exist, for example, a general electric vehicle (EV) configured to acquire power only using electric energy, a hybrid electric vehicle (HEV) configured to acquire power using electric energy but also thermal energy produced by combustion of fossil fuels, and a Plug-in Hybrid Electric Vehicle (PHEV) configured to use both electric energy and thermal energy caused by combustion of fossil fuels and capable of charging a battery embedded therein upon receiving electric energy from an external source (e.g., the power grid).

SUMMARY

Therefore, it is an aspect of the present disclosure to provide a vehicle and a vehicle charging apparatus configured to improve charging efficiency as well as to reduce production costs.

Additional aspects of the invention will be set forth in part in the description which follows and, in part, will be apparent from the description, or may be learned by practice of the disclosed embodiments.

In accordance with embodiments of the present disclosure, a vehicle charging apparatus includes: an AC/DC converter configured to variably output a DC link voltage; and a DC/DC converter electrically connected to the AC/DC converter and configured to acquire an output voltage by conversion of the DC link voltage outputted by the AC/DC converter and transmit the acquired output voltage to a battery. The AC/DC converter includes: a first switch element configured to adjust a power factor of the AC/DC converter according to an operation of the first switch element, and a second switch element configured to increase the DC link voltage outputted by the AC/DC converter according to the operation of the first switch element.

The AC/DC converter may further include: a first inductor connected to an input/output (I/O) terminal, and a second inductor connected to the input/output (I/O) terminal, connected in parallel to the first inductor, and connected to the second switch element.

The vehicle charging apparatus may further include at least one capacitor formed at a branch line located between the second inductor and the second switch element.

The AC/DC converter may further include at least one diode electrically connected to the first inductor, wherein the first switch element is formed at a branch line located between the first inductor and the at least one diode.

The second switch element may be switched on or off according to an output voltage applied to the battery.

When the second switch element is switched on, the DC link voltage outputted by the AC/DC converter may increase.

The DC/DC converter may include: a third switch element configured to receive an output current of the AC/DC converter, a first wiring having a first end connected to the third switching element, and a fourth switch element connected to a second end of the first wiring.

The DC/DC converter may further include at least one capacitor formed at a branch line located between the third switch element and the AC/DC converter.

The third switch element and the fourth switch element may be configured to operate according to a fixed switching frequency.

The fixed switching frequency may be defined to control ripples of an output voltage of the DC/DC converter.

The DC/DC converter may further include: a third inductor connected to the first end of the first wiring and a fourth inductor connected in series to the third inductor, and connected in parallel to the first wiring.

A ratio between inductance of the third inductor and inductance of the fourth inductor may be defined as represented by the following Equation 1:

$$m = \frac{L_r + L_m}{L_r}. \qquad \text{[Equation 1]}$$

In Equation 1, m denotes a ratio between inductances, Lr denotes the inductance of the third inductor, and Lm denotes the inductance of the fourth inductor. The ratio between inductance of the third inductor and inductance of the fourth inductor may be higher than 3.

The vehicle charging apparatus may further include a noise filtering portion connected to the AC/DC converter and configured to reduce noise of a transferred current.

At least one of the first switch element and the second switch element may include at least one of a Bipolar Junction Transistor (BJT), a thyristor, a Field Effect Transistor (FET), and an Insulated Gate Bipolar mode Transistor (IGBT).

Furthermore, in accordance with embodiments of the present disclosure, a vehicle includes: a vehicle charging apparatus, a battery electrically connected to the vehicle charging apparatus, and charged by a current supplied by the vehicle charging apparatus, a measurement portion configured to measure a voltage applied to the battery, and a controller configured to control the vehicle charging apparatus based on the voltage applied to the battery measured by the measurement portion. The vehicle charging apparatus includes: an AC/DC converter configured to variably output a DC link voltage and including a first switch element and a second switch element that increases the DC link voltage outputted by the AC/DC converter according to an operation of the first switch element; and a DC/DC converter electrically connected to the AC/DC converter and configured to acquire an output voltage through conversion of the DC link voltage outputted by the AC/DC converter and transmit the acquired output voltage to the battery. The controller is configured to increase the DC link voltage outputted by the AC/DC converter by controlling the second switch element.

The first switch element may be configured to adjust a power factor of the AC/DC converter according to the operation of the first switch element.

The AC/DC converter may further include: a first inductor connected to an input/output (I/O) terminal, a second inductor connected to the input/output (I/O) terminal, connected in parallel to the first inductor, and connected to the second switch element and at least one capacitor formed at a branch line located between the second inductor and the second switch element.

The second switch element may be switched on or off according to a control signal of the controller.

When the second switch element is switched on, the DC link voltage outputted by the AC/DC converter may increase.

The DC/DC converter may include: a third switch element configured to receive an output current of the AC/DC converter, a first wiring having a first end connected to the third switching element, and a fourth switch element connected to a second end of the first wiring.

The third switch element and the fourth switch element may be operated according to a fixed switching frequency.

BRIEF DESCRIPTION OF THE DRAWINGS

These and/or other aspects of the present disclosure will become apparent and more readily appreciated from the following description of the embodiments, taken in conjunction with the accompanying drawings of which.

Figure 1:
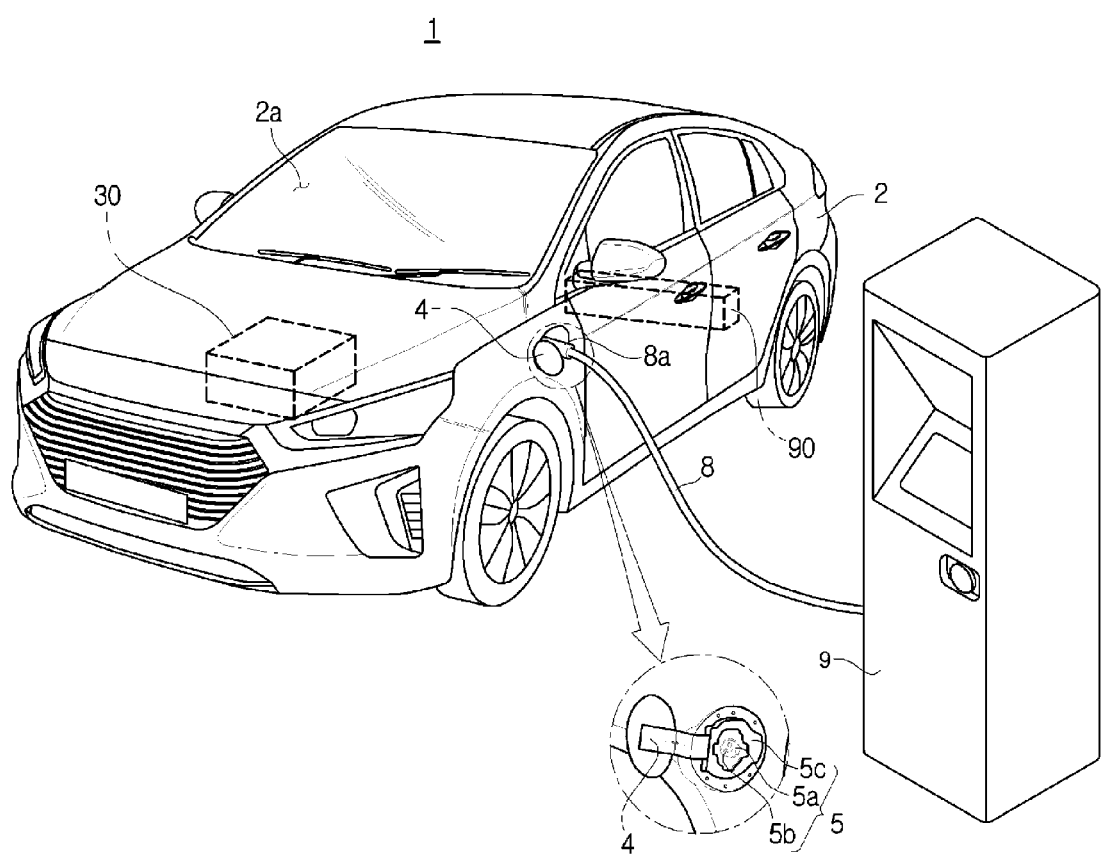
FIG. 1 is a view illustrating a vehicle and a vehicle charging apparatus according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, embodiments of the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Reference will now be made in detail to the embodiments of the present disclosure, examples of which are illustrated in the accompanying drawings, wherein like reference numerals refer to like elements throughout.

A vehicle and a vehicle charging apparatus according to embodiments of the present disclosure will hereinafter be described with reference to FIGS. 1 to 9.

FIG. 1 is a view illustrating a vehicle and a vehicle charging apparatus according to embodiments of the present disclosure.

As shown in FIG. 1, a vehicle 1 may include a general four-wheeled vehicle, for instance. Alternatively, the vehicle 1 may include not only a four-wheeled vehicle, but also a two-wheeled vehicle, a three-wheeled vehicle, construction equipment, a motorized bicycle, a train traveling on rails, and the like.

In accordance with embodiments of the present disclosure, the vehicle 1 may be movable by rotating wheels using electric energy as a primary or supplemental source of power. In this case, the vehicle 1 may be any one of a general electric vehicle, a hybrid electric vehicle, and a plug-in hybrid electric vehicle (PHEV).

Referring to FIG. 1, the vehicle 1 may include a body 2 forming the appearance of the vehicle 1, an indoor space 2a partitioned from an outdoor space by the body 2, a drive motor 30 installed at one position of the indoor space 2a so as to convert electric energy into power energy, and a battery 90 configured to store electric energy and supply the stored electric energy to the drive motor 30 as necessary.

In accordance with embodiments of the present disclosure, the vehicle 1 may further include an engine (not shown) configured to convert combustion energy of fossil fuels such as gasoline or diesel into power energy. A power receiving portion 3 configured to receive electric energy to be stored in the battery 90 from the external part may be formed at the external appearance of the body 2.

In accordance with embodiments of the present disclosure, the power receiving portion 3 may be installed to at least one of several points of the external appearance of the body 2. For example, the power receiving portion 3 may be formed at some parts of the front fender or the rear fender of the vehicle 1 in a manner that the power receiving portion 3 is located to face a side direction of the vehicle 1. In addition, the power reception portion 3 may be installed at a front surface of the body 1. In more detail, the power reception portion 3 may also be installed at a front lower end of a bonnet (i.e., hood) coupled to the body 1. The power reception portion 3 may also be installed at a certain position of the external surface of the body 2 according to random selection of a system designer.

In accordance with embodiments of the present disclosure, the power reception portion 3 may include an opening/closing portion 4 opened to expose a terminal portion 5 to the outside or closed to close the terminal portion 5, and the terminal portion 5 coupled to a power-supply connector 8a formed at one end of a power-supply cable 8. The terminal portion 5 may include an insertion groove 51 in which the power-supply connector 8a is inserted and mounted, and at least one pin 5b mounted to the inside of the insertion groove 5a. If the power-supply connector 8a is mounted to the insertion groove 5a, at least one pin 5b may be inserted into and connected to a hole (not shown) of the power-supply connector 8a. Therefore, at least one connection pin 5b may be electrically connected to the power-supply connector 8a, and the vehicle 1 may be electrically connected to the external power-supply device 9. If necessary, the terminal portion 5 may further include a cover 5c configured to open or close the insertion groove 5a and the connection pin 5b in such a manner that the insertion groove 5a and the connection pin 5b can be more safely protected from external stimulus.

The power-supply cable 8 may electrically connect the vehicle 1 to the power-supply device 9, such that the battery 90 of the vehicle 1 can be charged with power supplied from the power-supply device 9. The power-supply connector 8a capable of being detachably coupled to the vehicle 1 may be located at one end of the power-supply cable 8, and the other end of the power-supply cable 8 may be fixed to the power-supply device 9.

The power-supply device 9 may charge the battery 90 of the vehicle 1 by supplying power and/or current to the vehicle 1 through the power-supply cable 8. The power-supply device 9 may receive necessary electric energy from the external commercial power source, and may transmit the received electric energy to the vehicle 1. In this case, the external commercial power source may be an AC power source or a DC power source. The power-supply device 8 may provide an alternating current (AC) or a direct current (DC) to the vehicle 1. The power-supply device 9 may be designed to retain or change a voltage and/or a current of the electrical signal supplied from the commercial power source. In addition, the power-supply device 9 may measure the amount of power charged in the vehicle 1 as necessary, or may also be designed to provide a user with either information indicating whether charging of the vehicle 1 begins or other information indicating the degree of battery charge.

In accordance with embodiments of the present disclosure, the power-supply device 9 may include a low-speed charger or a high-speed charger. In addition, the power-supply device may include an Electric Vehicle Supply Equipment (EVSE) or an In-Cable Control Box according to one embodiment of the present disclosure.

Figure 2:
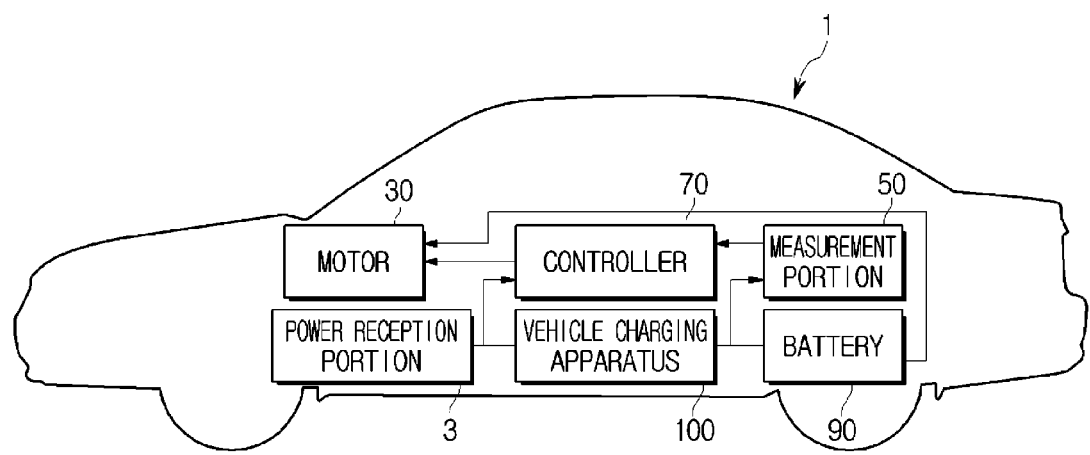
FIG. 2 is a control block diagram illustrating the vehicle and the vehicle charging apparatus according to embodiments of the present disclosure.

FIG. 2 is a control block diagram illustrating the vehicle and the vehicle charging apparatus according to embodiments of the present disclosure.

As shown in FIG. 2, the vehicle 1 may include a power reception portion 3 configured to allow a current supplied from the external power-supply device 9 to enter the vehicle 1, a vehicle charging apparatus 100 directly or indirectly connected to the power reception portion 3, and a battery 90 directly or indirectly connected to the vehicle charging apparatus 100.

As described above, the power reception portion 3 may receive electric energy from the power-supply device 9 according to connection between the power-supply connector 8a and the terminal portion 5, and may transmit the received electric energy to the vehicle charging apparatus 100 through at least one circuit or at least one conductive wire. Some parts of the current transferred through the power reception portion 3 may also be transferred to a controller 70. The controller 70 may determine whether power is supplied to the vehicle 1 on the basis of a current received from the power reception portion 3, and may control the vehicle charging apparatus 100 according to the determined result.

The vehicle charging apparatus 100 may operate to properly charge the battery 90 with electricity. For example, the vehicle charging apparatus 100 may improve a power rating (or power factor) by converting an alternating current (AC) applied to the vehicle charging apparatus 100 into a direct current (DC), or may output a predetermined voltage by changing the applied voltage, such that the battery 90 can be charged with electricity according to a voltage of the battery 90. In accordance with embodiments of the present disclosure, the vehicle charging apparatus 100 may be implemented using an On-Board Charger (OBC).

A detailed description of the vehicle charging apparatus 100 will hereinafter be given.

The battery 90 may be installed in the vehicle 1, may be charged with electric energy, and may be designed to power on respective constituent components embedded in the vehicle 1, for example, various devices (e.g., a motor, an air conditioner, an instrument panel, a navigation device, etc.) embedded in the vehicle 1 as necessary.

For example, the battery 90 may be implemented using at least one of various kinds of batteries, for example, a lithium-based battery (e.g., a lithium-titanium battery, a lithium-polymer battery, a lithium-ion battery, and a lithium-air battery), a lead battery, a nickel-cadmium battery, and a sodium-nickel-chloride battery.

The battery 90 may be installed at a certain position contained in the vehicle 1 according to selection of the designer. For example, the battery 90 may be installed at a lower part of the vehicle 1, may be installed in the bonnet (i.e., hood), or may be installed either at the rear of a back seat or in a trunk lid. In addition, the battery 90 may be installed to at least one of various positions capable of being considered by the designer.

In accordance with embodiments of the present disclosure, one battery 90 may be installed in the vehicle 1 or a plurality of batteries 90 may be installed in the vehicle 1. The vehicle 1 may further include a drive motor 30 configured to operate according to electric energy supplied from the battery 90, a measurement portion 50 configured to acquire information regarding an electrical signal output from the vehicle charging apparatus 100, and a controller 70 configured to control overall operation of the vehicle 1.

The drive motor 30 may receive electric energy from the battery 90, and may convert the received electric energy into mechanical energy. With respect to driving of the drive motor 30, the vehicle 1 may acquire power needed for various operations. For example, the drive motor 30 may be configured to acquire power needed for vehicle wheels. In this case, mechanical energy acquired by the drive motor 30 may be transferred to at least one wheel mounted to the body 1, and the at least one wheel may rotate by the transferred energy, such that the vehicle 1 can move or travel. If necessary, the drive motor 30 may be omitted.

In addition, the drive motor 30 may be configured to acquire power needed for at least one of various operations capable of being performed according to the operation of the motor 120, for example, rotation of wheels 101, operation of a fuel pump, operation of an oil pump, and/or adjustment of a back of a driver seat or a passenger seat.

In accordance with embodiments of the present disclosure, the motor 120 may be at least one of a DC motor, an AC motor, a DC brushless motor, and a linear induction motor. Various kinds of motors capable of being considered by the designer may also be applied to the above-mentioned motor 120.

The measurement portion 50 may measure the output voltage (see V2 of FIG. 4) of the vehicle charging apparatus 100. The measurement portion 50 may be implemented using various measurement devices capable of measuring a DC voltage or an AC voltage.

In more detail, the measurement portion 50 may be electrically connected to at least one of the battery 90 and the capacitor (see 199 of FIG. 4), and may be configured to measure a voltage applied to the battery 90 and the capacitor 199.

The measurement portion 50 may output the measurement result using an electrical signal, and may be transferred to the controller 70 mounted to the vehicle 1 through the conductive wire or the circuit. For example, the voltage applied to the battery 90 or the capacitor 199 may be configured in the form of an electrical signal, and may then be transferred to the controller 70.

The controller 70 may generate a control signal for the vehicle 1 or at least one component mounted in the vehicle 1, and may transmit the control signal to the at least one component in such a manner that the component mounted in the vehicle 1 can operate as necessary. The controller 70 may communicate with at least one of the motor 30, the measurement portion 50, and the vehicle charging apparatus 100. In accordance with one embodiment, the controller 70 may communicate with at least one of the motor 30, the measurement portion 50, and the vehicle charging apparatus 100 through the circuit or the conductive wire, or may communicate with at least one of the motor 30, the measurement portion 50, and the vehicle charging apparatus 100 through various wireless communication networks. In this case, the wireless communication network may be implemented using various communication technologies, for example, Bluetooth, Wi-Fi, Controller Area Network (CAN), Wi-Fi Direct, or Near Field Communication (NFC), etc.

For example, the controller 70 may be implemented using a Central Processing Unit (CPU) or a Micro Controller Unit (MCU), or may be implemented using an Electronic Control Unit (ECU). The CPU, the MCU, or the ECU may be implemented using one or more semiconductor chips or associated constituent components. In addition, the CPU, the MCU, or the ECU may process various kinds of operations of the vehicle 1 on the basis of programs or data embedded or entered by the user. The CPU, the MCU, or the ECU may be installed at a certain position of the indoor space 2a of the body 2 according to selection of the designer. For example, the CPU, the MCU, or the ECU may be installed at a substrate mounted to the space between the board and the engine room.

In accordance with embodiments of the present disclosure, the controller 70 may receive the electrical signal indicating data of the output voltage (any one of V3 to V5) detected by the measurement portion 50 from the measurement portion 50, may generate a control signal on the basis of the received output voltage (any one of V3 to V5), and may transmit the control signal to at least one switch element (146, 150, 171 or 172 of FIG. 4) of the vehicle charging apparatus 100. Therefore, the controller 70 may control the on/off operation of at least one switch 146, 150, 171 or 172 of the vehicle charging apparatus 100.

Various embodiments of the vehicle charging apparatus 100 will hereinafter be described with reference to FIGS. 3 to 6.

Figure 3:
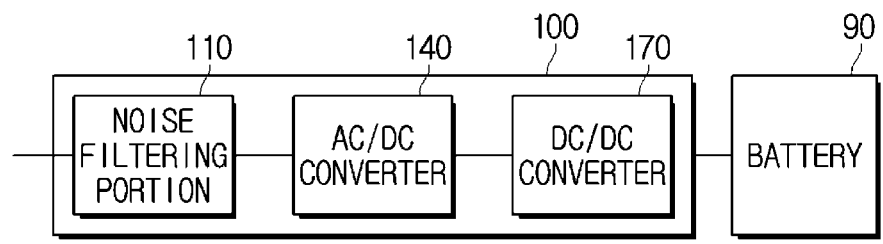
FIG. 3 is a block diagram illustrating the vehicle charging apparatus according to embodiments of the present disclosure.

FIG. 3 is a block diagram illustrating the vehicle charging apparatus according to embodiments of the present disclosure.

The vehicle charging apparatus 100 may be a low-speed charger. In this case, the vehicle charging apparatus 100 may include a noise filtering portion 110, an AC/DC converter 140, and a DC/DC converter 170 as shown in FIG. 3.

The noise filtering portion 110 may remove noise of the electrical signal received from the power reception portion 3. The vehicle charging apparatus 100 may cause an Electro-Magnetic Interference (EMI) problem due to the on/off operation of high-frequency switch elements 146 and 150. In addition, the power-supply device 9 may transmit AC power to the vehicle charging apparatus 100, and the vehicle charging apparatus 100 may be directly coupled to the power-supply device 9 through the power reception portion 3 and the power-supply connector 8a. As a result, noise generated by the vehicle charging apparatus 100 may also be applied to the power-supply device 9. The noise filtering portion 110 may remove or minimize noise applied to the power-supply device 9 as described above. For example, the noise filtering portion 110 may be implemented using an EMI filter. Alternatively, the noise filtering portion 110 may be omitted as necessary.

The electrical signal having passed through the noise filtering portion 110 may be applied to the AC/DC converter 140 through the circuit or the conductive wire. The AC/DC converter 140 may convert AC power into DC power.

In accordance with embodiments of the present disclosure, the AC/DC converter 140 may also be implemented using a Power Factor Correction (PFC) converter. In this case, the PFC converter may be implemented using any one of a passive PFC scheme or an active PFC scheme.

In addition, the AC/DC converter 140 may also be implemented using a voltage doubler circuit. Therefore, the AC/DC converter 140 may output a DC link voltage V2 while simultaneously changing the DC link voltage V2. In addition, the AC/DC converter 140 may also be implemented by combining the PFC converter and the voltage doubler circuit.

Figure 4:
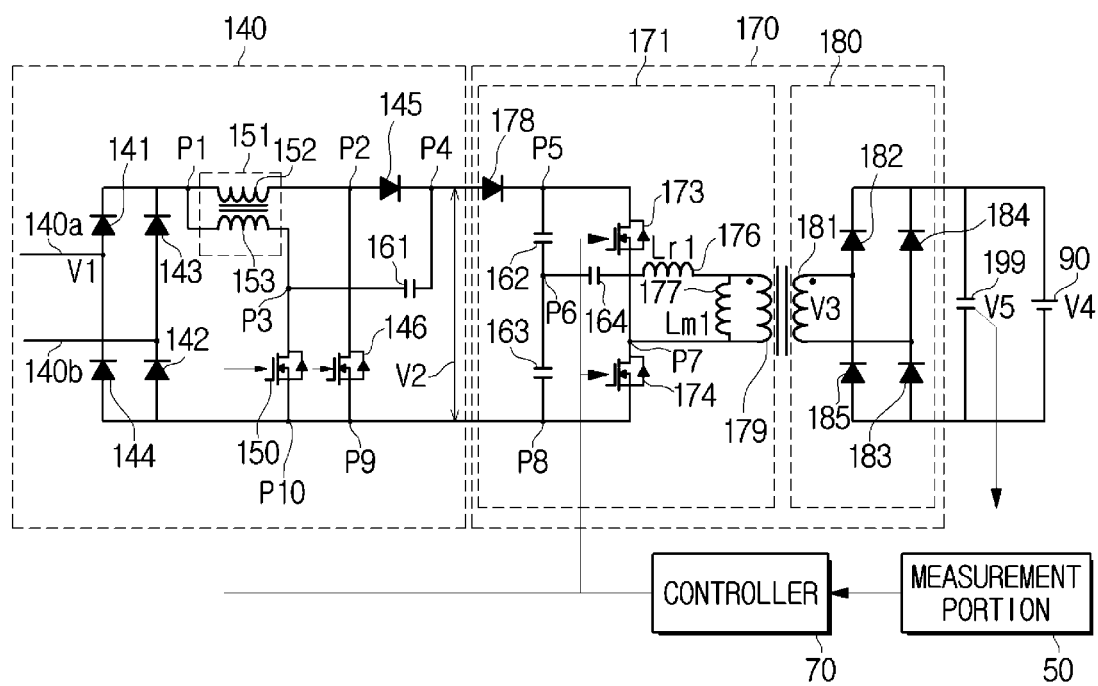
FIG. 4 is a circuit diagram illustrating the vehicle charging apparatus according to embodiments of the present disclosure.
Figure 5:
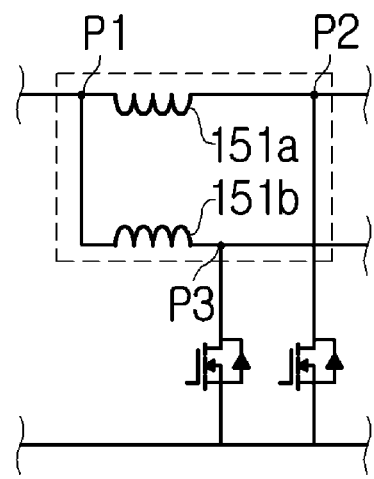
FIG. 5 is another circuit diagram illustrating the vehicle charging apparatus according to embodiments of the present disclosure.

FIG. 4 is a circuit diagram illustrating the vehicle charging apparatus according to embodiments of the present disclosure, and FIG. 5 is another circuit diagram illustrating the vehicle charging apparatus according to embodiments of the present disclosure.

Referring first to FIG. 4, the AC/DC converter 140 may include a first input/output (I/O) terminal 140a, a second I/O terminal 140b, a plurality of diodes 141, 142, 143, 144 and 148, a plurality of switch elements 146 and 150, a plurality of inductors 152 and 153, and a capacitor 161 (hereinafter referred to as a "first capacitor").

A current received from the power reception portion 3 may be applied to at least one of the first I/O terminal 140a and the second I/O terminal 140b. The current applied to the first and second I/O terminals 140a and 140b may be an AC current. Therefore, a current may be transferred from the external part to the first I/O terminal 140a at a specific point and may be output to the external part through the second I/O terminal 140b at the specific point. At the other point, a current may be input to the second I/O terminal 140b, and may be output through the first I/O terminal 140a.

A voltage V1 applied to the first and second I/O terminals 140a and 140b may correspond to a voltage supplied from the power-supply device 9.

The voltage V1 applied to the first and second I/O terminals 140a and 140b may be an AC voltage. For example, assuming that the charging capacity obtained by the vehicle charging apparatus 100 is set to 3.3 kW, the voltage V1 applied to the first and second I/O terminals 140a and 140b may be an AC voltage being changed with a predetermined frequency in the range from 70V to 285V.

The first to fourth diodes 141 to 144 from among the plurality of diodes 141, 142, 143, 144 and 148, may be directly coupled to the I/O terminals 140a and 140b, and may determine the direction of a current received through the I/O terminals 140a and 140b.

In accordance with embodiments of the present disclosure, the first to fourth diodes 141 to 144 may be implemented as a bridge structure as shown in FIG. 4.

The first diode 141 and the fourth diode 144 may be connected to the first input terminal 140a. The current received through the first input terminal 140a may be transferred to the first diode 141. In addition, the second diode 142 and the third diode 143 may be connected to the second input terminal 140b. The current received through the second input terminal 140a may be transferred to the third diode 143.

In accordance with embodiments of the present disclosure, the first diode 141 and the third diode 143 may be electrically connected to an inductor module 151. The inductor module 151 may include the plurality of inductors 152 and 153. The inductors 152 and 153 may be connected in parallel to each other. In more detail, the line connected to the I/O terminals 140a and 140b through one end may be branched into a plurality of branch lines at a first point (p1), and the first inductor 152 and the second inductor 153 may be connected in parallel to each branch line.

In accordance with embodiments of the present disclosure, the inductors 152 and 153 may be coupled to each other as shown in FIG. 4. For example, the inductors 152 and 153 may be installed adjacent to one or more cores. If the inductors 152 and 153 are coupled to each other as described above, overall inductance may be changed according to mutual inductance between the inductors 152 and 153. In addition, the inductors 151a and 151b may be spaced apart from each other in such a manner that there is little or no influence between the inductors 151a and 151b. In other words, the inductors 151a and 151b may be configured not to be coupled to each other.

Referring again to FIG. 4, one end of the first inductor 152 from among the inductors 152 and 153 may be connected to the I/O terminals 140a and 140b, and the other end of the first inductor 152 may be electrically connected to the fifth diode 145 through the second point (p2). The current having passed through the fifth diode 145 may be transferred to the DC/DC converter 170. The above-mentioned characteristics may also be applied to the other inductor 151a from among the inductors 151a and 151b not coupled to each other.

The second point (p2) may be formed between the first inductor 152 and the fifth diode 145. The line may be branched into a plurality of lines at the second point (p2). The branched line may be electrically connected to the ninth point (p9). The ninth point (p9) may be located at the line through which the DC/DC converter 170, the second diode 142, and the fourth diode 144 are connected to one another. The first switch element 146 from among the switches 146 and 150 may be installed at the connection line of the second point (p3) and the ninth point (p9).

The first switch element 146 may be switched on or off according to a control signal received from the controller 70. In this case, the first switch element 146 may be periodically and repeatedly switched on or off.

The power factor of the internal components of the AC/DC converter 140 may be adjusted according to periodic status change of the first switch element 146. In more detail, a phase difference in voltage and current being output from the AC/DC converter 140 may be corrected or adjusted according to the on/off operation of the first switch element 146, such that the power factor of the internal components of the AC/DC converter 140 can be compensated for.

One end of the first switch element 146 may be connected to the second point (p2) through the line, and the other end of the first switch element 146 may be connected to the ninth point (p9) through the line.

The first switch element 146 may be implemented using a predetermined component capable of performing the switching operation. For example, the first switch element 146 may be implemented using a transistor. In this case, the transistor may include at least one of a Bipolar Junction Transistor (BJT), a thyristor, a Field Effect Transistor (FET), and an Insulated Gate Bipolar mode Transistor (IGBT). The FET may include a metal semiconductor field-effect transistor (MESFET), a metal oxide semiconductor field effect transistor (MOSFET), etc.

If the first switch element 146 is implemented using a transistor, a control signal having a predetermined voltage received through the controller 70 may be applied to a base terminal of the transistor. An emitter terminal and a collector terminal of the first switch element 146 may be electrically connected to each other upon receiving the control signal. If the first switch element 146 is implemented using the FET, a control signal (i.e., gate signal) having a predetermined voltage may be applied to a gate terminal, and a source terminal and a drain terminal may be electrically connected to each other upon receiving the control signal.

In accordance with embodiments of the present disclosure, one end of the second inductor 153 from among the plurality of inductors 152 and 153 may be electrically connected to the I/O terminals 140a and 140b, and the other end of the second inductor 153 may be electrically connected to the second switch element 150 from among the plurality of switch elements 146 and 150. For example, the second inductor 153 and the second switch element may be directly or indirectly connected to each other through a predetermined line implemented using the circuit or the conductive wire.

The connection line of the second inductor 153 and the second switch element 150 may be branched from the third point (p3). The branched line may be connected to the first capacitor 161.

One end of the first capacitor 161 may be connected to the line branched from the third point (p3), and the other end of the first capacitor 161 may be connected to the line connected to the fourth point (p4) of the DC/DC converter 170.

The second switch element 150 may be switched on or off according to the control signal received from the controller 70.

One end of the second switch element 150 may be connected to the line connected to the second inductor 153, and the other end of the second switch element 150 may be connected to the tenth point (p10). The tenth point (p10) may be located at the line for connecting the DC/DC converter 170 to the second diode 142 and the fourth diode 144. The tenth point (p9) may be formed at the line located relatively closer to the second diode 142 and the fourth diode 144. Therefore, the current having passed through the ninth point (p9) may be applied to any one of the second diode 142 and the fourth diode 144 through the tenth point (p9), and may be transferred to the I/O terminals 140a and 140b.

The DC link voltage V2 being output from the AC/DC converter 140 may be changed according to the operation of the second switch element 150. For example, assuming that the second switch element 150 is switched on or periodically switched on or off according to the control signal of the controller 70, the AC/DC converter 140 may output the DC link voltage V2 relatively higher than the voltage V1 received through the I/O terminals 140a and 140b. In this case, the output DC link voltage V2 may be about double that of the input voltage V1. For example, assuming that the V1 voltage 400V is input through the I/O terminals 140a and 140b, the DC link voltage V2 of about 700V may be output from the AC/DC converter 140 according to the operation of the second switch element 150.

The second switch element 150 may be implemented using various components needed for switching. In this case, the second switch element 150 may be implemented as the same switching component as the first switch element 146, or may be implemented as another switching component different from the first switch element 146.

For example, the second switch element 150 may be implemented using a transistor, for example, a Bipolar Junction Transistor (BJT), a thyristor, a Field Effect Transistor (FET), or an Insulated Gate Bipolar mode Transistor (IGBT). In the same manner as in the first switch element 146, the FET may include a metal semiconductor field-effect transistor (MESFET), a metal oxide semiconductor field effect transistor (MOSFET), etc.

In the same manner as in the first switch element 146, if the second switch element 150 is implemented using the transistor, the second switch element 150 may electrically interconnect an emitter terminal and a collector terminal according to the control signal applied to a base or gate terminal, or may electrically interconnect a source terminal and a drain terminal.

In accordance with embodiments of the present disclosure, the second switch element 150 may be periodically switched on or off according to the control signal of the controller 70, or may be continuously switched on or off for a predetermined period of time.

The DC/DC converter 170 may be electrically connected to the AC/DC converter 140, may change the magnitude of the output voltage of the AC/DC converter 140, and may output the changed voltage to the battery 90 so as to charge the battery 90.

Referring again o FIG. 4, the DC/DC converter 170 may include a DC/AC converter 171 and an AC/DC converter 180.

The DC/AC converter 171 may be electrically connected to the AC/DC converter 140, and may convert DC power into AC power according to the operation of the plurality of switch elements 173 and 174.

The DC/AC converter 171 may include at least one diode 178, at least one capacitor 162 to 164, a plurality of inductors 176 and 177, and a first wiring 179.

For example, the DC/AC converter 171 may include at least one diode 178 (hereinafter referred to as the "sixth diode"). In accordance with embodiments of the present disclosure, the DC/AC converter 171 may further include another diode connected in series or in parallel to the sixth diode 178.

The sixth diode 178 may be connected to the fifth diode 145 through at least one line. In this case, the output terminal of the fifth diode 145 may be connected to the input terminal of the sixth diode 178, such that a current may be transferred from the fifth diode 145 to the sixth diode 178. In addition, the sixth diode 178 may also be connected to the first capacitor 161 through the line connected to the fourth point (p4). In this case, the input terminal of the sixth diode 178 may be electrically connected to the first capacitor 161 through the line.

At least one line may be connected to the output terminal of the sixth diode 178. The line connected to the output terminal of the sixth diode 178 may be branched from the fifth point (p5), and any one of the branched lines may be connected to the eighth point (p8), and the other branched line may be connected to the third switch element 173. The eighth point (p8) may be located at the line connected to any one of the fourth switch element 174, the second diode 142, and the fourth diode 144.

In accordance with embodiments of the present disclosure, one or more capacitors 162 and 163 may be disposed between the fifth point (p5) and the eighth point (p8). For example, the second capacitor 162 and the third capacitor 163 may be sequentially installed at the connection line ranging from the fifth point (p5) to the eighth point (p8). Any one of the second capacitor 162 and the third capacitor 163 may be omitted as necessary.

If the first switch element 146 and the second switch element 150 are simultaneously operated, the DC link voltage V2 being output from the AC/DC converter 150 may be relatively high. Therefore, assuming that several capacitors 162 and 163 are provided as shown in FIG. 4, the respective capacitors 162 and 163 can be prevented from being damaged even when a relatively high DC link voltage V2 is applied to the respective capacitors 162 and 163.

The connection line between the fifth point (p5) and the eighth point (p8) may be branched from the sixth point (p6) disposed between the second capacitor 162 and the third capacitor 163. The line branched from the sixth point (p6) may be electrically connected to one end of the first wiring 179.

In accordance with embodiments of the present disclosure, the fourth capacitor 164 and the third inductor 176 may be sequentially arranged from the sixth point (p6) within the range from the sixth point (p6) to the first wiring 179.

Figure 6:
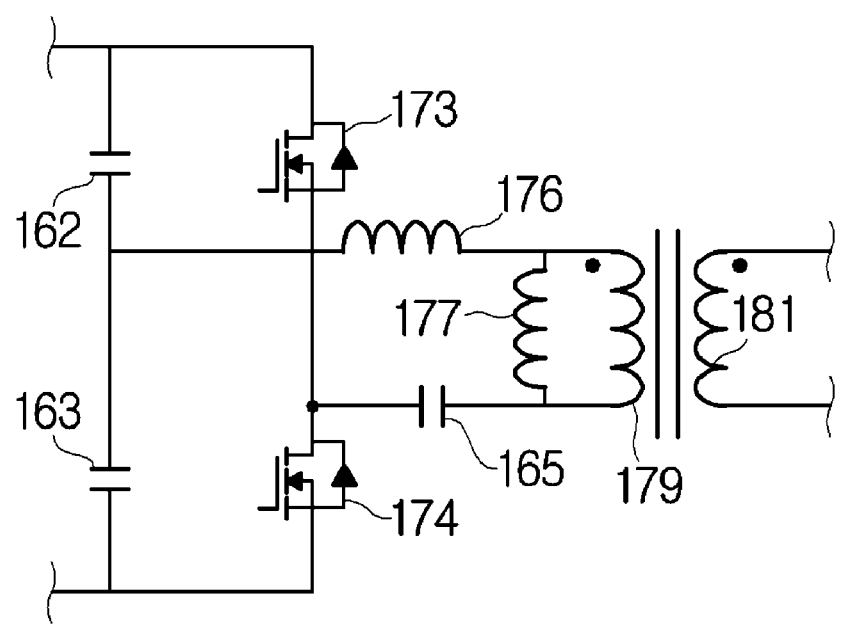
FIG. 6 is a circuit diagram illustrating a DC/DC converter according to embodiments of the present disclosure.

FIG. 6 is a circuit diagram illustrating a DC/DC converter according to embodiments of the present disclosure.

In accordance with embodiments of the present disclosure, as shown in FIG. 6, only the third inductor 176 may be arranged between the first wiring 179 and the sixth point (p6).

The other line branched from the fifth point (p5) may be connected to one end of the third switch element 173, and the other end of the third switch element 173 may be connected to one end of the fourth switch element 174. The line connected to the other end of the fourth switch element 174 may be connected to the eighth point (p8).

A branch line may be formed at the seventh point (p7) disposed between the third switch element 173 and the fourth switch element 174, and the branch line may be electrically connected to the other end of the first wiring 179.

At least one of the third switch element 173 and the fourth switch element 174 may be switched on or off according to the control signal of the controller 70.

The third switch element 173 and the fourth switch element 174 may be implemented as the same kind of switching components, or may be implemented as different kinds of switching components.

The third switch element 173 and the fourth switch element 174 may be implemented using at least one of various kinds of transistors in the same manner as in the first switch element 164 and the second switch element 165. The third switch element 173 and the fourth switch element 174 may be arranged to cross each other such that the third switch element 173 and the fourth switch element 174 can be switched on or off. For example, assuming that the third switch element 173 is switched on, the fourth switch element 174 can be controlled to be switched off. In contrast, assuming that the third switch element 173 is switched off, the fourth switch element 174 can be controlled to be switched on.

In addition, the above-mentioned operations of the third switch element 173 and the fourth switch element 174 may be periodically carried out. In other words, the third switch element 173 may be periodically switched on and off, and the fourth switch element 174 may be periodically switched off and on in a different way from the third switch element 173.

Since the third switch element 173 and the fourth switch element 174 are operated as described above, the current may periodically flow in directions opposite to each other in the first wiring 179. As a result, another current corresponding to the current flowing in the first wiring 179 may be induced in a wiring 181 (hereinafter referred to as a "second wiring") of the AC/DC converter 180 according to magnetic induction. In addition, a voltage corresponding to the voltage applied to the first wiring 179 may be applied to the second wiring 181. The voltage applied to the second wiring 181 or the current flowing in the second wiring 181 may be determined according to not only the number of winding times of the first wiring 179 but also the number of winding times of the second wiring 181.

In accordance with embodiments of the present disclosure, the third switch element 173 and the fourth switch element 174 may be temporarily and simultaneously switched on, or may be temporarily and simultaneously switched off. For example, when the third switch element 173 is transitioned from the OFF state to the ON state, the fourth switch element 174 may also be continuously switched on for a predetermined time.

In addition, the third switch element 173 and the fourth switch element 174 may be controlled in various patterns according to random selection of the designer. The first wiring 179 may be located adjacent to the second wiring 181 of the AC/DC converter 180, and may be wound around the core one or more times. One end of the first wiring 179 may be connected in series to the third inductor 176, and the other end of the first wiring 179 may be connected to the seventh point (p7).

In accordance with embodiments of the present disclosure, the fourth inductor 177 may be connected in parallel to the first wiring 179. The fourth inductor 177 may be connected in series to the third inductor 176.

Also, as shown in FIG. 6, at least one fifth capacitor 165 may be disposed between the other end of the first wiring 179 and the seventh point (p7). If the fifth capacitor 165 is provided, the fourth capacitor 164 may be omitted as necessary. One end of the fifth capacitor 165 may be connected to the other end of the first wiring 179, and the other end of the fifth capacitor 165 may be connected to the fourth switch element 174.

The AC/DC converter 180 may include the second wiring 181 and the plurality of diodes 182 to 185.

The induced alternating current (AC) may flow into the second wiring 181 in response to change of the current flowing into the first wiring 179. In this case, the voltage V3 corresponding to the number of winding times of the first wiring 179 wound on the core and the number of winding times of the second wiring 181 wound on the core may be applied to the second wiring 181. The alternating current (AC) flowing into the second wiring 181 may be converted into a direct current (DC) through the plurality of diodes 182 to 185, and may then be transferred to the battery 90.

In more detail, the seventh diode 182 and the tenth diode 185 from among the plurality of diodes 182 to 185 may be connected to one end of the second wiring 181, and the eighth diode 183 and the ninth diode 184 may be connected to the other end of the second wiring 181. A current being output from one end of the second wiring 181 may be applied to the battery 90 through the seventh diode 182, and may be transferred to the other end of the second wiring 181 through the eighth diode 183. In contrast, the current being output from the other end of the second wiring 181 may be applied to the battery 90 through the ninth diode 184, and may be input to one end of the second wiring 181 through the tenth diode 185.

A voltage V4 corresponding to the voltage V3 applied to the second wiring 181 may be applied to the battery 90. The voltage V4 applied to the battery 90 may be identical or similar to the voltage V3 applied to the second wiring 181.

In accordance with embodiments of the present disclosure, the fifth capacitor 199 may be connected in parallel to the battery 90. The fifth capacitor 199 may be installed to stabilize the fifth capacitor 199. Since the fifth capacitor 199 is connected in parallel to the battery 90, the voltage applied to the fifth capacitor 199 may be theoretically identical to the voltage V4 applied to the battery 90.

As described above, the measurement portion 50 may detect and measure the voltage V5 applied to the fifth capacitor 199, and may transmit the measurement result to the controller 70.

The controller 70 may generate a control signal according to the measurement result of the voltage V5 received from the measurement portion 50, and may transmit the control signal to at least one of the plurality of switch elements 146, 150, 173, and 174.

For example, the controller 70 may transmit a control signal (e.g., a gate signal) to the second switch element 150, such that the second switch element 150 can operate. For example, upon receiving the control signal from the controller 70, the second switch element 150 may be switched on or may be alternately switched on and off. According to the operation of the second switch element 150, the AC/DC converter 140 may output a relatively higher voltage V2, such that the relatively higher voltage V2 may be applied to the DC/DC converter 170. Therefore, the voltage applied to the DC/DC converter 170 may be controlled on the basis of the voltage V3 being output from the DC/DC converter 170.

In accordance with embodiments of the present disclosure, assuming that the charge voltage V4 of the battery 70 (i.e., the output voltage V3 of the DC/DC converter 170) is relatively low, the controller 70 may transmit a control signal to the second switch 150 in a manner that the DC link voltage V2 can be further increased. For example, when the charging voltage V4 of the battery 70 is measured to be 240V, the controller 70 may determine that the measured charge voltage V4 is relatively low, and may generate a control signal for increasing the charge voltage V4 to a higher voltage (e.g., 413V). In this case, the control signal may be applied to the second switch element 150, and the second switch element 150 may operate according to the control signal, such that the DC link voltage V2 can be more relatively increased. For example, the DC link voltage V2 may increase from 430V to 673V according to the operation of the second switch element 150.

If the voltage applied to the DC/DC converter 170 is adjusted according to the voltage V3 being output from the DC/DC converter 170, a gain between the voltage applied to the DC/DC converter 170 and the output voltage V3 of the DC/DC converter 170 may be maintained approximately constant or may be controlled to have only a value contained in a predetermined range.

In addition, the controller 70 may transmit the control signal to at least one of the third switch element 173 and the fourth switch element 174, and may control at least one switching frequency from among the third switch element 173 and the fourth switch element 174. Ripples of the voltage V3 being output from the DC/DC converter 180 may be controlled under the control of the switching frequency of the third switch element 173 and the fourth switch element 174. In other words, the switching frequency of the third switch element 173 and the fourth switch element 174 may be controlled to control ripples of the voltage being output from the DC/DC converter 170. In this case, at least one switching frequency from among the third switch element 173 and the fourth switch element 174 may be fixed as necessary.

Figure 7:
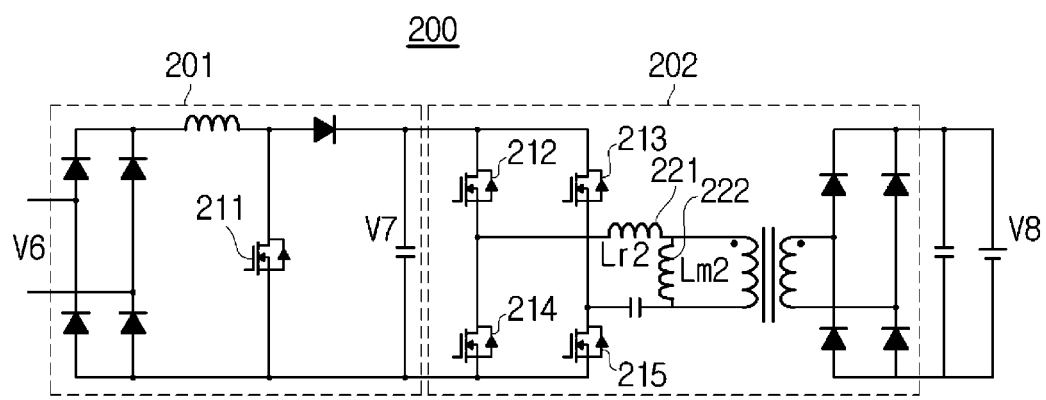
FIG. 7 is a circuit diagram illustrating a conventional On-Board Charger (OBC)
Figure 8:
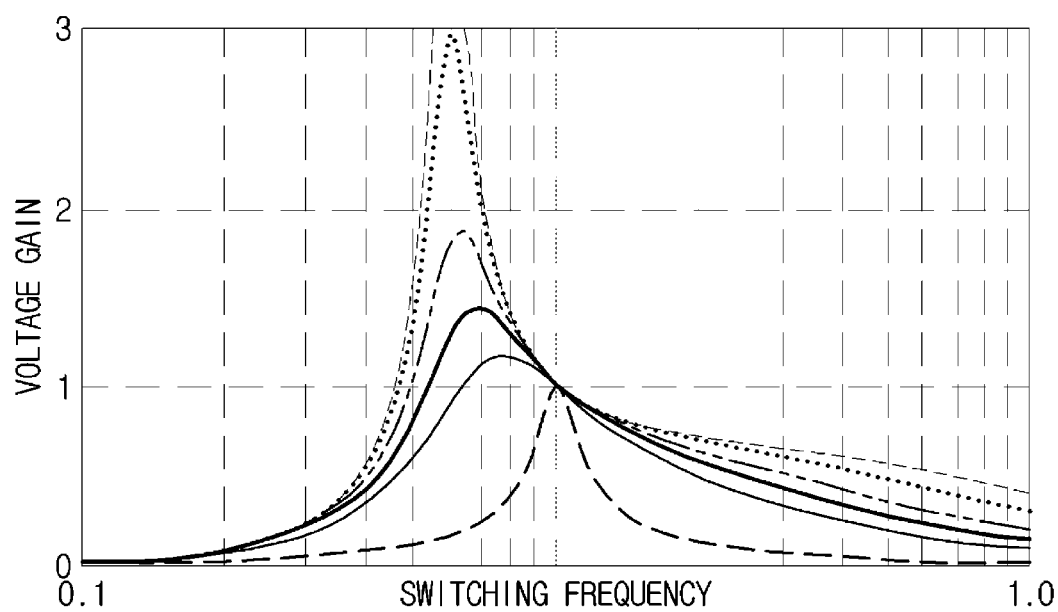
FIG. 8 is a graph illustrating the relationship between the switching frequency and the voltage gain when an inter-inductance ratio is set to 3.
Figure 9:
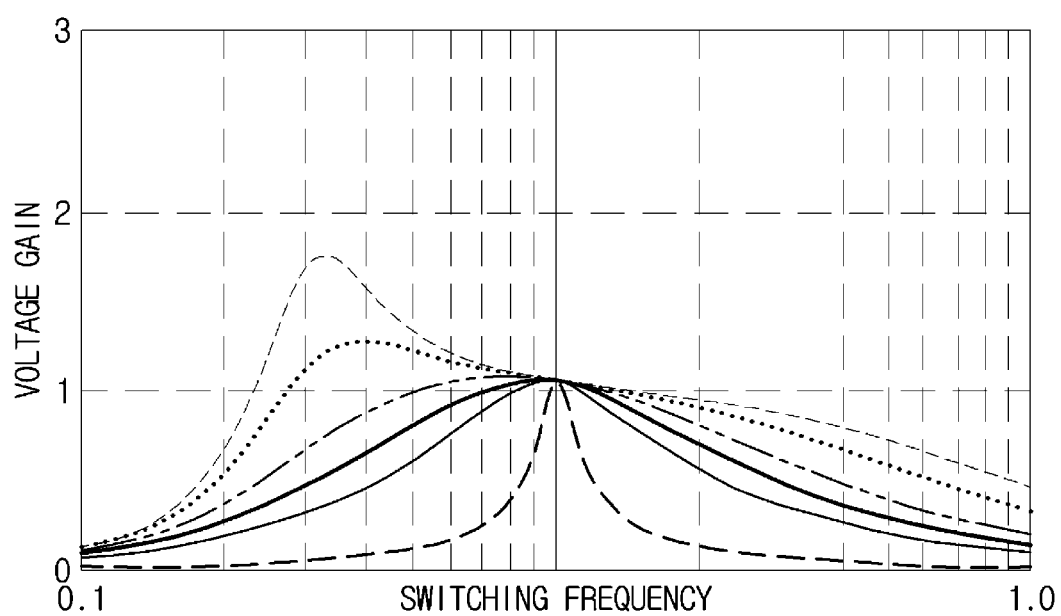
FIG. 9 is a graph illustrating the relationship between the switching frequency and the voltage gain when the inter-inductance ratio is set to 7.

FIG. 7 is a circuit diagram illustrating a conventional On-Board Charger (OBC), and FIG. 8 is a graph illustrating the relationship between the switching frequency and the voltage gain when an inter-inductance ratio is set to 3. FIG. 9 is a graph illustrating the relationship between the switching frequency and the voltage gain when the inter-inductance ratio is set to 7.

As shown in FIG. 7, only one switch element 201 for controlling a power factor may be mounted to the AC/DC converter 201 of the conventional OBC 200. In addition, the conventional AC/DC converter 201 may output a fixed output voltage V7 (for example, the output voltage of 400V) corresponding to the input voltage V6. Therefore, the conventional OBC 200 must control the switching frequency of each switch element 212 to 215 contained in the DC/DC converter 202 so as to properly adjust the voltage V8 being output from the OBC 200. The input voltage V6 of the conventional OBC 200 is fixed. In order to acquire a broad-range output voltage V7, the conventional OBC 200 needs to be designed in a manner that the switching frequencies of the switch elements 212 to 215 can be changed in a broad range.

In contrast, the above-mentioned vehicle charging apparatus 100 may control the AC/DC converter 140 in a manner that the voltage V2 applied to the DC/DC converter 170 is relatively increased even when the switching frequencies of the third switch element 173 and the fourth switch element 174 are fixed. Therefore, the switching frequencies of the third switch element 173 and the fourth switch element 174 need not be changed in a broad range, resulting in reduction in design complexity.

In addition, the conventional OBC 200 must have a high voltage gain so as to acquire a broad-range output voltage V7. To this end, the OBC 200 must be designed to acquire a high voltage-gain peak value. In order to acquire a high voltage-gain peak value, it is necessary for the inter-inductance ratio (m) defined by the following Equation 1 to be reduced to a low inter-inductance ratio:

$$m = \frac{L_r + L_m}{L_r}. \qquad \text{[Equation 1]}$$

In Equation 1, m may denote the inter-inductance ratio (m). Lr may denote inductances Lr1 and Lr2 of the inductors 176 and 221 connected in series to the first wiring, and Lm may denote inductances Lm1 and Lm2 of the inductors 177 and 222 connected in parallel to the first wiring.

A gain peak value between the input voltages (V2, V7) and the output voltages (V3, V8) may be changed in inverse proportion to the inter-inductance ratio (m). For example, whereas a voltage-gain peak value is relatively high when the inter-inductance ratio (m) is set to 3 as shown in FIG. 8, a voltage-gain peak value is relatively low when the inter-inductance ratio (m) is set to 7 as shown in FIG. 9.

Accordingly, the conventional OBC 200 has been designed to have a lower inter-inductance ratio (m) to implement a high voltage-gain peak value. Therefore, it is necessary for magnetization inductance (Lm2) of the inductor 222 connected in parallel to the wiring to be reduced to a relatively low magnetization inductance. However, assuming that the magnetization inductance (Lm2) is set to a relatively low magnetization inductance as described above, a magnetization current flowing into the inductor 222 may increase, and a feedback current may also increase in proportion to the increasing magnetization current. The increasing feedback current may unavoidably increase conversion loss generated when the switch elements 212 to 215 are turned off, resulting in reduction in overall operation efficiency of the OBC 200.

In contrast, according to the above-mentioned vehicle charging apparatus 100, the voltage V2 applied to the DC/DC converter 170 is relatively high according to the operation of the AC/DC converter 140, and the DC/DC converter 170 may output an appropriate voltage V3 even when the voltage gain peak value is relatively low. Therefore, the voltage gain may be established to have a relatively small range. In other words, the voltage gain peak value need not be set to a high peak value. Therefore, the output voltage V3 of the vehicle charging apparatus 100 can be properly acquired even when the inter-inductance ratio (m) is high.

For example, as shown in FIG. 9, the vehicle charging apparatus 100 may properly perform voltage transformation even when the inter-inductance ratio (m) is set to 7. In this case, the fourth inductor 177 connected in parallel to the wiring may have a relatively high magnetization inductance (Lm1), such that a peak value of the magnetization current flowing into the fourth inductor 177 is reduced and the amount of loss generated when the switch elements 173 and 174 are switched off can be greatly reduced.

In addition, only one switch element 201 is mounted to the AC/DC converter 201 of the conventional OBC 200. As a result, assuming that the output voltage V7 of the AC/DC converter 201 is relatively increased, a duty of the switch element 201 increases and an effective current flowing into the switch element 201 also increases, such that the switch element 201 can be easily damaged.

In contrast, the AC/DC converter 140 for use in the above-mentioned vehicle charging apparatus 100 includes a plurality of switch elements (i.e., the first switch element 146 and the second switch element 147), such that the duty of each switch element 146 or 147 can be reduced and the amount of loss of each switch element 146 or 147 can be greatly reduced.

In accordance with the above-mentioned vehicle charging apparatus 100, the DC link voltage V2 applied to the DC/DC converter 170 is relatively high, such that the DC/DC converter 170 can be implemented only using two switch elements 173 and 174. In more detail, whereas the DC/DC converter 202 of the conventional OBC 200 needs to have four switch elements 212 to 215 as shown in FIG. 7, the DC/DC converter 170 of the above-mentioned vehicle charging apparatus 100 must have only two switch elements 173 and 174 as shown in FIG. 4. In other words, the number of switch elements for use in the DC/DC converter 170 can be reduced. Therefore, the DC/DC converter 170 and the vehicle charging apparatus 100 can be miniaturized, such that circuit design complexity can be reduced and production costs needed for circuit design can also be reduced.

Although the vehicle and the vehicle charging apparatus according to embodiments of the present disclosure have been disclosed herein merely for illustrative purposes, the scope or spirit of the embodiments is not limited thereto, and those skilled in the art will appreciate that various modifications, additions and substitutions are possible, without departing from the scope and spirit of the disclosure as disclosed in the accompanying claims. For example, adequate effects of the present disclosure may be achieved even if the foregoing processes and methods may be carried out in different order than described above, and/or the aforementioned elements, such as systems, structures, devices, or circuits, may be combined or coupled in different forms and modes than as described above or be substituted or switched with other components or equivalents.

As is apparent from the above description, the vehicle and the vehicle charging apparatus according to the embodiments of the present disclosure can improve vehicle charging efficiency, and can reduce production costs of the vehicle and the vehicle charging apparatus.

The vehicle and the vehicle charging apparatus according to the embodiments of the present disclosure can reduce loss of a switch element of the vehicle charging apparatus while simultaneously suppressing heat generation of the switch element even when a relatively high input voltage is applied to a DC/DC converter, resulting in efficiency improvement of the switch element.

The vehicle and the vehicle charging apparatus according to the embodiments of the present disclosure can allow the DC/DC converter to have a relatively high magnetization inductance so as to reduce switch turn-off loss, such that the vehicle and the vehicle charging apparatus can improve efficiency of the charging operation.

The vehicle and the vehicle charging apparatus according to the embodiments of the present disclosure can fix a switching frequency of the DC/DC converter so as to implement a small-sized vehicle charging apparatus, such that the vehicle can be easily and conveniently manufactured.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A vehicle charging apparatus comprising:
an AC/DC converter configured to variably output a DC link voltage; and
a DC/DC converter electrically connected to the AC/DC converter and configured to acquire an output voltage by conversion of the DC link voltage outputted by the AC/DC converter and transmit the acquired output voltage to a battery, wherein the DC/DC converter comprises a plurality of switch elements,
wherein the AC/DC converter includes:
  a first switch element configured to adjust a power factor of the AC/DC converter according to an operation of the first switch element, and
  a second switch element configured to increase the DC link voltage outputted by the AC/DC converter according to an operation of the second switch element,
wherein the output voltage acquired by the DC/DC converter is applied to the battery,
wherein the AC/DC converter is configured to switch the second switch element on or off, when the output voltage outputting by the DC/DC converter based on a first DC link voltage is lower than a predetermined output voltage, to output a second DC link voltage higher than the first DC link voltage to the DC/DC converter, and wherein the plurality of switch elements of the DC/DC converter are configured to operate according to a fixed switching frequency.

2. The vehicle charging apparatus according to claim 1, wherein the AC/DC converter further includes:
a first inductor connected to an input/output (I/O) terminal; and
a second inductor connected to the input/output (I/O) terminal, connected in parallel to the first inductor, and connected to the second switch element.

3. The vehicle charging apparatus according to claim 2, further comprising:
at least one capacitor formed at a branch line located between the second inductor and the second switch element.

4. The vehicle charging apparatus according to claim 2, wherein the AC/DC converter further includes:
at least one diode electrically connected to the first inductor,
wherein the first switch element is formed at a branch line located between the first inductor and the at least one diode.

5. The vehicle charging apparatus according to claim 1, wherein:
when the second switch element is switched on, the DC link voltage outputted by the AC/DC converter increases.

6. The vehicle charging apparatus according to claim 1, wherein the DC/DC converter includes:
a third switch element configured to receive an output current of the AC/DC converter;
a first wiring having a first end connected to the third switching element; and
a fourth switch element connected to a second end of the first wiring.

7. The vehicle charging apparatus according to claim 6, wherein the DC/DC converter further includes:
at least one capacitor formed at a branch line located between the third switch element and the AC/DC converter.

8. The vehicle charging apparatus according to claim 1, wherein the fixed switching frequency is defined to control ripples of an output voltage of the DC/DC converter.

9. The vehicle charging apparatus according to claim 6, wherein the DC/DC converter further includes:
a third inductor connected to the first end of the first wiring; and
a fourth inductor connected in series to the third inductor and connected in parallel to the first wiring.

10. The vehicle charging apparatus according to claim 9, wherein:
a ratio between inductance of the third inductor and inductance of the fourth inductor is defined by the following equation:

$$m = \frac{L_r + L_m}{L_r},$$

where m denotes a ratio between inductances, Lr denotes the inductance of the third inductor, and Lm denotes the inductance of the fourth inductor, and
the ratio between inductance of the third inductor and inductance of the fourth inductor is higher than 3.

11. The vehicle charging apparatus according to claim 1, further comprising:

a noise filtering portion connected to the AC/DC converter and configured to reduce noise of a transferred current.

12. The vehicle charging apparatus according to claim 1, wherein at least one of the first switch element and the second switch element includes at least one of a Bipolar Junction Transistor (BJT), a thyristor, a Field Effect Transistor (FET), and an Insulated Gate Bipolar mode Transistor (IGBT).

13. A vehicle comprising:
a vehicle charging apparatus;
a battery electrically connected to the vehicle charging apparatus and charged by a current supplied by the vehicle charging apparatus;
a measurement portion configured to measure a voltage applied to the battery; and
a controller configured to control the vehicle charging apparatus based on the voltage applied to the battery measured by the measurement portion,
wherein the vehicle charging apparatus includes:
an AC/DC converter configured to variably output a DC link voltage and including a first switch element and a second switch element that increases the DC link voltage outputted by the AC/DC converter according to an operation of the second switch element; and
a DC/DC converter electrically connected to the AC/DC converter and configured to acquire an output voltage through conversion of the DC link voltage outputted by the AC/DC converter and transmit the acquired output voltage to the battery, wherein the DC/DC converter comprises a plurality of switch elements,
wherein the controller is configured to increase the DC link voltage outputted by the AC/DC converter by controlling the second switch element,
wherein the output voltage acquired by the DC/DC converter is applied to the battery,
wherein the AC/DC converter is configured to switch the second switch element on or off, when the output voltage outppputted by the DC/DC converter based on a first DC link voltage is lower than a predetermined output voltage, to output a second DC link voltage higher than the first DC link voltage to the DC/DC converter, and
wherein the plurality of switch elements of the DC/DC converter are configured to operate according to a fixed switching frequency.

14. The vehicle according to claim 13, wherein the first switch element is configured to adjust a power factor of the AC/DC converter according to an operation of the first switch element.

15. The vehicle according to claim 13, wherein the AC/DC converter further includes:
a first inductor connected to an input/output (I/O) terminal;
a second inductor connected to the input/output (I/O) terminal, connected in parallel to the first inductor, and connected to the second switch element; and
at least one capacitor formed at a branch line located between the second inductor and the second switch element.

16. The vehicle according to claim 13, wherein the second switch element is switched on or off according to a control signal of the controller.

17. The vehicle according to claim 16, wherein:
when the second switch element is switched on, the DC link voltage outputted by the AC/DC converter increases.

18. The vehicle according to claim 13, wherein the DC/DC converter includes:
a third switch element configured to receive an output current of the AC/DC converter;
a first wiring having a first end connected to the third switching element; and
a fourth switch element connected to a second end of the first wiring.

\* \* \* \* \*